US006944645B2

(12) United States Patent
George et al.

(10) Patent No.: US 6,944,645 B2
(45) Date of Patent: Sep. 13, 2005

(54) METHOD AND SYSTEM FOR CUSTOMIZING ELECTRONIC COMMUNICATIONS

(75) Inventors: Gary George, Sunnyvale, CA (US); Annette Luongo, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 926 days.

(21) Appl. No.: 09/759,701

(22) Filed: Jan. 12, 2001

(65) Prior Publication Data

US 2002/0095481 A1 Jul. 18, 2002

(51) Int. Cl.[7] ............................................... G06F 13/00
(52) U.S. Cl. ...................................... 709/206; 709/217
(58) Field of Search ................................ 709/217, 224, 709/230–234, 206; 705/14

(56) References Cited

U.S. PATENT DOCUMENTS

| | | | | | |
|---|---|---|---|---|---|
| 5,758,257 | A | * | 5/1998 | Herz et al. .................. 725/116 |
| 5,960,408 | A | * | 9/1999 | Martin et al. ................. 705/11 |
| 6,009,410 | A | * | 12/1999 | LeMole et al. ............... 705/14 |
| 6,029,140 | A | * | 2/2000 | Martin et al. ................. 705/11 |
| 6,292,784 | B1 | * | 9/2001 | Martin et al. ................. 705/11 |
| 6,321,256 | B1 | * | 11/2001 | Himmel et al. ............. 709/218 |
| 6,460,036 | B1 | * | 10/2002 | Herz ........................... 707/10 |
| 6,701,362 | B1 | * | 3/2004 | Subramonian et al. ...... 709/224 |
| 2001/0042047 | A1 | * | 11/2001 | Nishida et al. ............... 705/51 |

* cited by examiner

Primary Examiner—Kenneth R. Coulter

(57) ABSTRACT

A vendor provides a customer an electronic communications system for customizing the content and the delivery date of product information. The communications system also keeps the vendor informed of evolving customer interests. In one embodiment, a computer-implemented method for customizing electronic communications to a customer includes storing a set of customer-provided data in a first database, the customer-provided data being associated with a customer identification code and characterizing the customer. A set of customer-behavioral data is then generated in response to a data selection made by the customer at an informational database and is stored in the first database in association with the customer identification code. A content database is configured for storage of a plurality of product data sets and then at least one product data set is selected from the content database as a function of the customer-provided data and the customer-behavioral data. The customer is then sent the data set from the selecting step via a communications network.

27 Claims, 2 Drawing Sheets

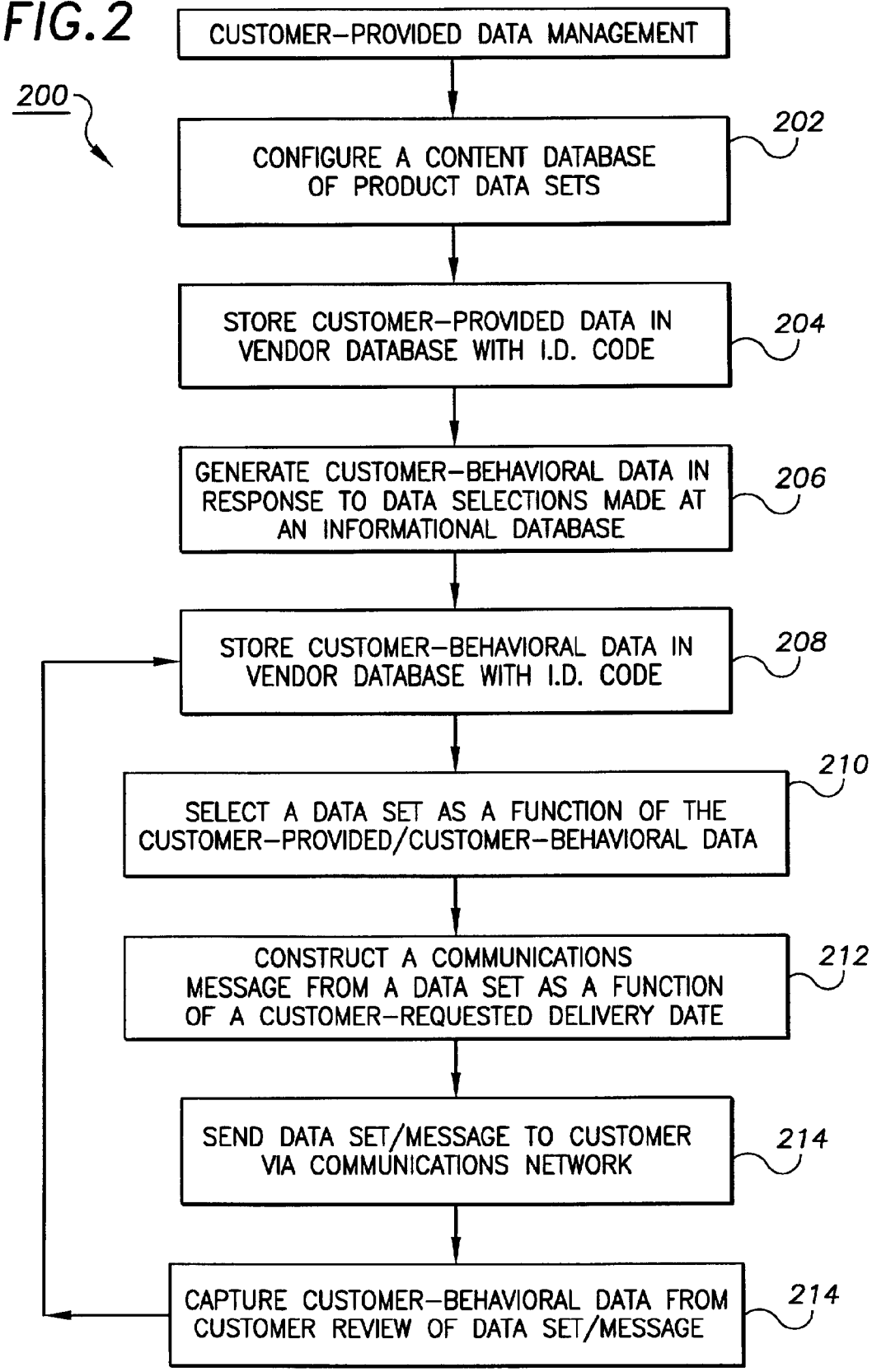

METHOD AND SYSTEM FOR
CUSTOMIZING ELECTRONIC
COMMUNICATIONS

FIELD OF THE INVENTION

The present invention generally relates to customer-subscribed newsletters and more particularly to the management of electronic communications received by customers from vendors and service providers.

BACKGROUND OF THE INVENTION

A factor contributing to the success of any vendor is the ability to target a communication to a selected segment of the purchasing public having a need for certain products and/or services being offered by the vendor. Effective communications with current and potential customers may lead to the growth of the vendor's revenue. However the vendor may be insufficiently integrated with the customer so as to be apprised of changes in customers' interests.

In order to more effectively identify those individuals that might be interested in certain products or services, numerous data sources have been developed for helping vendors with their marketing and advertising efforts. For example, vendors establish databases which are representative of individuals who have purchased certain products or services in the past. Data is gathered from interviews and telephone solicitations. Related data is also obtained from other sources such as zip code-based address market data services, government motor vehicle listings, or from purchases made by credit card.

Customers, on the other hand, would appreciate being informed of the latest developments and availability of new products and services. However, the number of resources of information available combined with a decrease in the time available for research has made it difficult for customers to become reasonably educated before making a purchase. The Internet has been extremely helpful in reducing research time but reviewing electronic newsletter subscriptions and visiting certain websites on a regular basis to receive development updates is also becoming increasingly difficult. Finally, the explosive use of electronic mail as a communications medium has made it difficult for consumers to review and consider the content of incoming electronic mail, in view of the volume, before the information contained therein becomes outdated.

It would be highly desirable to have a method for improving the quality and reducing the quantity of product information being sent to a customer. It would also be desirable to have an electronic communications system that would enable a vendor to monitor changing customer interests as they occur.

A method and a system that address the aforementioned problems, as well as other related problems, are therefore desirable.

SUMMARY OF THE INVENTION

The present invention is directed to addressing the above and other needs in connection with the customization of electronic communications by a customer with respect to content and receipt date. It has been discovered that a vendor or service provider is able to improve his knowledge base with respect to his customers' evolving interests without directly involving the customer in a time consuming exercise in data gathering.

According to one aspect of the invention, a computer-implemented method for customizing electronic communications to a customer includes storing a set of customer-provided data in a first database, the customer-provided data being associated with a customer identification code and characterizing the customer. A set of customer-behavioral data is then generated in response to a data selection made by the customer at an informational database and is stored in the vendor database in association with the customer identification code. A content database is configured for storage of a plurality of product data sets and then at least one product data set is selected from the content database as a function of the customer-provided and the customer-behavioral data. The customer is then sent the data set from the selecting step via a communications network.

According to another aspect of the invention, a system for customizing electronic communications to a customer includes a first database configured to store a set of customer-provided data, associated with a customer identification code, that characterizes the customer. The first database is also configured to store a set of customer-behavioral data in association with the customer identification code, the customer-behavioral data being generated in response to a data selection made by the customer from a second database. The system further includes a third database configured to store a plurality of product data sets and includes a server arrangement configured to select at least one product data set from the third database as a function of the customer-provided data and the customer-behavioral data. The server is also configured to construct and send a communications message to the customer via a communications network in response to a message delivery date specified in the customer-provided data.

It will be appreciated that various other embodiments are set forth in the Detailed Description and Claims that follow.

BRIEF DESCRIPTION OF THE DRAWINGS

Various aspects and advantages of the invention will become apparent upon review of the following detailed description and upon reference to the drawings in which:

FIG. 2 is a flowchart illustrating the manner that a customer customizes the content and delivery date of electronic communications in accordance with an example embodiment of the invention.

Figure 1:
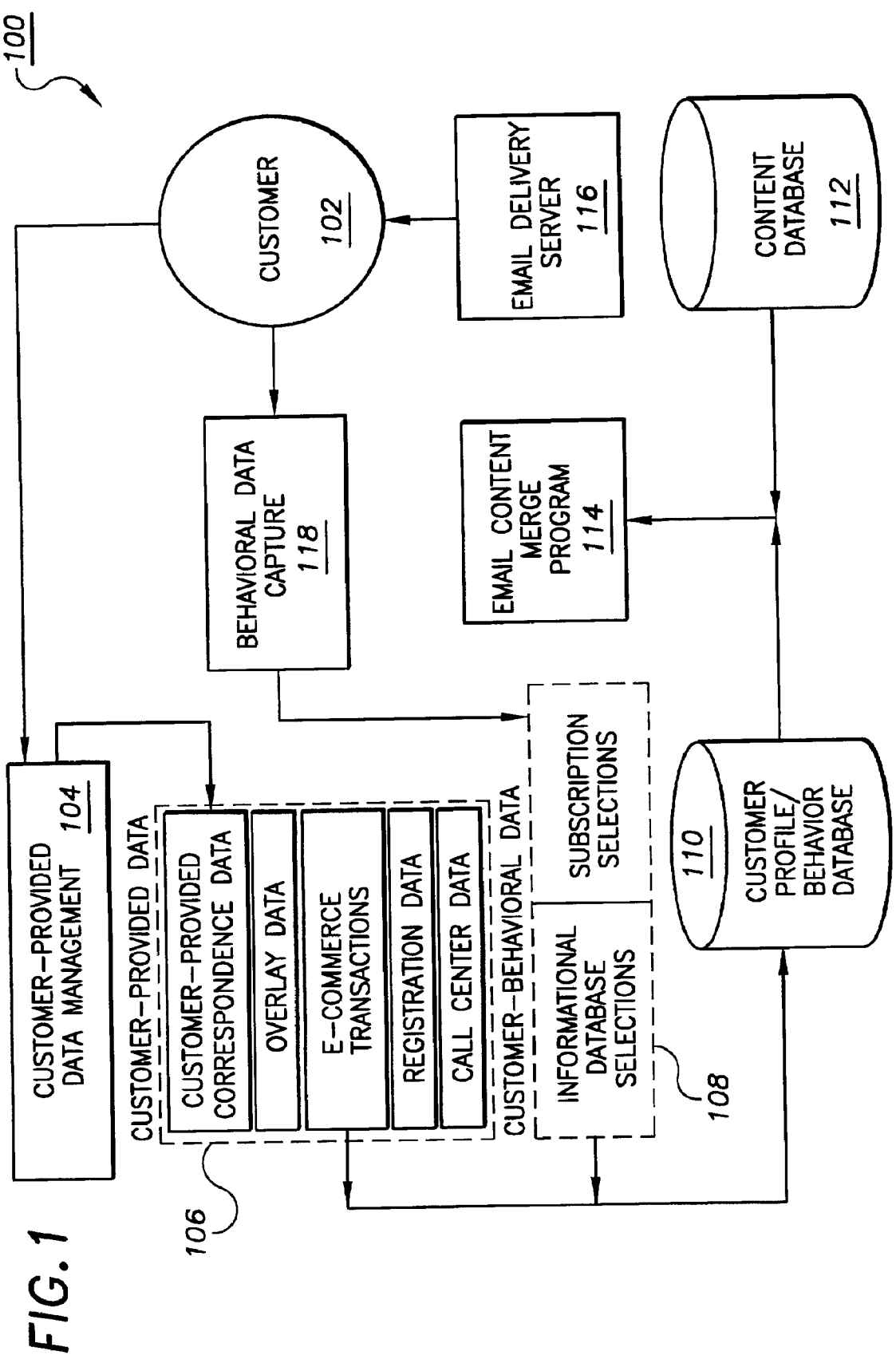
FIG. 1 is a block diagram of an electronic communications system in accordance with an example embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Various embodiments of the present invention are described in terms of an electronic communications system that allows customers to customize content and delivery of information and that enables vendors to be apprised of evolving customer interests. Those skilled in the art will appreciate that the invention could be implemented in a variety of programming languages, computer platforms and communications systems.

Referring now to the figures, FIG. 1 is a block diagram of an electronic communications system 100 in accordance with an example embodiment of the invention. System 100 includes a customer node 102 for providing access via a communications network (e.g. Internet) to a system 104 for managing customer-provided data 104. Data management system 104 includes a plurality of customer-provided data sets 106 and a plurality of customer-behavioral data sets 108 that are stored in a customer profile/behavioral database 110. In this example embodiment, the customer accesses system 104 via a vendor-sponsored website that identifies the customer via an electronic mail address. In this example, the e-mail address serves as a customer identification code but the vendor can choose to issue a customer code that is more descriptive or has more meaning to the vendor other than an e-mail address. Example customer-provided data 106 identifies customer-requested correspondence gathered from a survey of the customer. Data describing e-commerce transactions that the customer is involved with are also captured and forwarded to database 110. Product or warranty registration data that are provided, either manually (filling out information cards), through point of sale merchant locations or on-line are also captured and stored in database 110. Call center data are also gathered by customer service representatives and stored with other customer-coded information in database 110. Other data, such as overlay data, can be included in database 110 to further enhance the vendor's knowledge of his customer's interests and purchasing habits. Overlay data includes demographic data, data from public records or credit card data that can be purchased and used to learn more about certain customer attributes. All the customer-provided data is stored in database 110 in association with the customer identification code.

Database 110 is also configured to store a plurality of customer-behavioral data sets 108 associated with the customer identification code. The customer-behavioral data is generated in response to a data selection made by the customer from other databases. For instance, customers who access a vendor website choose to review information on products and services. Such selections are captured as customer-behavioral data as an indication of what the customer is interested in. The act of subscribing to electronic newsletters as well as selecting certain web links within an electronic publication are captured as behavioral data 108 and stored in database 110 with the customer identification code. In addition, access to vendor suggested web sites via web site links are also recorded as customer-behavioral data 108 in database 110.

System 100 also includes a content database 112 provided by the vendor. The content database is configured to store a plurality of product data sets. Content database 112 is also configured to include information on services that are provided by the vendor. Database 112 is updated on a regular basis to reflect the vendor's latest offerings.

In this example embodiment, databases 110 and 112 provide input data to an e-mail content merge program 114, which operates in conjunction with a server arrangement 116. The e-mail content merge program is configured to select at least one product data set from content database 112 as a function of the customer-provided data and the customer-behavioral data. For example, based on the accumulated customer profile/behavioral data in database 110, the customer's interests are gauged and information that reflects the interests of the customer is drawn from content database 112. Server 116 is configured to construct and send a communications message, such as an e-mail message, to the customer via a communications network in response to a message delivery date indicated by the customer in customer-provided data 106. Once the customer reviews the message and selects any web site links, which may be included in the communications message, the selections are captured as data via a behavioral data capture 118 and are recorded as part of database 110. In one example embodiment, an e-mail jumpstation arrangement captures the website-accessed information as behavioral data before the customer sees the actual website being accessed. An e-mail jumpstation is mechanism that records web link selections by instantaneously forwarding the web link selections to recording server. Once recorded the web link is immediately forwarded to the web address that was originally selected. This transmission normally occurs so rapidly that the transfer appears transparent to the person originally selecting the web link.

Display devices such as CRT monitors, cellular and regular telephone displays and personal digital assistant displays are useable to display the communications message to the customer at node 102. In addition, these display and communications devices can access the communications network (traditional or wireless, for example) to download the messages and input customer-provided data directly into database 110. In an example embodiment, voice and video data are also captured through these communications devices and is stored in database 110.

Referring now to FIG. 2, a flowchart 200 illustrates the manner in which a customer uses an electronic communications system 100 to customize the content and delivery date of electronic communications in accordance with an example embodiment of the invention. At step 202, the vendor configures content database 112 for storage of a plurality of product data sets. In this example embodiment, the content database includes the latest information on the vendor's products and services. At step 204, a set of customer-provided data is stored in database 110. The customer-provided data is stored along with the customer identification code for ease of tracking and retrieval. In one example embodiment, customer-provided data 106 are obtained via a manual or electronic customer-provided profile. The customer-provided profile selects or deselects topics of interests, for example. Where the customer is accessing a vendor web site, the customer can be queried for an identification code or the customer can request that an identification code be assigned to him. Thereafter, a list of topics such as Printing, Scanning, PC Projects, Photos, Digital Imaging, etc. is provided for selection. Customer selections are submitted for processing and stored as data 106 in database 110.

At step 206, a set of customer-behavioral data is generated in response to a data selection made by the customer at an informational database. In this example, the informational database includes databases or web sites that the vendor has recommended for customer review. At step 208, the generated data is stored in database 110 and associated with the customer identification code. The selection of a web link becomes data that is stored in database 110. Additional behavioral data that are captured and stored includes past customer purchases, previous interactions with the vendor, electronic newsletter subscriptions, the frequency of communications, and customer interactions with the vendor's web site.

At step 210, at least one product (or service) data set is selected from content database 112 as a function of the customer-provided data and the customer-behavioral data as well as a set of business rules defined by the vendor. In one example embodiment, one of the business rules dictates that certain selected information need not be sent since it is redundant with respect to information sent earlier. Another business rule dictates, for example, temporarily changing a customer's requested mailing date because new information has been loaded in content database 112 that is consistent with the customer's specified areas of interest. Therefore, the information should be sent sooner than the customer originally requested in the customer-provided data 106.

In another example, when sending a communications message to the customer, one of the business rules dictates that even though the customer has indicated interest in product A, information on a related service C should also be included. When the customer reviews the message, any interest that the customer has in service C, by selecting the web link, generates behavioral data that is stored in database 110. In this manner, the vendor learns more about the customer's interests and the customer learns more about what the vendor has to offer. This process enriches both parties.

At step 210, an electronic communications message is constructed via the e-mail content merge program 114. The communications message is constructed using at least one data set drawn from content database 112 as a function of a message delivery date requested in the customer-provided data. Server 116 then sends via a communications network the electronic message that includes the selected product data set. Upon customer review of the communications message, additional behavioral data are captured and stored as customer-behavioral data 108 in database 110. In one example embodiment, the customer-behavioral data is transmitted via an electronic mail jumpstation as the customer selects web links within the communications message. The process returns, at this point, to step 208 where the behavioral data is stored in database 110.

The present invention is believed to be applicable to a variety of electronic communication systems that maintain subscriber and customer lists and that are used to regularly communicate with their subscribers. The present invention has been found to be particularly applicable in reducing customer interactions while improving the quality of the information being sent to the customer. The present invention also has the advantage of incrementally developing a database on each customer's interests without requiring the customer to regularly update customer profile information. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A system for customizing electronic communications to a customer, the system comprising:

a first database configured to store a set of customer-provided data in association with a customer identification code and characterizing the customer, the first database configured to store a set of customer-behavioral data in association with the customer identification code, the customer-behavioral data generated in response to a data selection made by the customer from a second database;

a third database configured to store a plurality of product data sets; and a server arrangement configured to select at least one product data set from the third database as a function of the customer-provided and the customer-behavioral data and construct an email including at least a portion of the selected product data, the server configured to send the email via a communications network to the customer in response to a message delivery date specified in the customer-provided data.

2. The system of claim 1, wherein the customer-provided data of the first database includes data from at least one of the group consisting of customer survey data, electronic commerce transactions, product and service registration data, call center data, point of sale information and demographic data.

3. The system of claim 1, wherein the customer-behavioral data includes customer selections of electronic newsletter subscriptions.

4. The system of claim 3, further comprising an electronic jump station arrangement adapted to capture and store customer-behavioral data in the first database.

5. The system of claim 1, wherein the customer specifies a transmission frequency for the number of times the communications message is sent in a predetermined time period.

6. The system of claim 2, wherein the server arrangement further includes a content merge program configured to construct the communications message as a function of a set of business rules defined by the vendor.

7. The system of claim 1, further comprising a display arrangement communicatively coupled to the server and adapted for displaying the communications message to the customer.

8. The system of claim 1, wherein the communications network includes a wireless network.

9. The system of claim 7, wherein the display arrangement includes at least one of the group consisting of a CRT monitor, a cellular phone display, and a personal digital assistant display.

10. The system of claim 7, further comprising a data input device adapted to input customer-provided data into the first database.

11. A method for customizing electronic communications, comprising:

storing a set of user-provided data in association with a user identification code in response to input of the user-provided data, wherein the user-provided data is descriptive of the user and includes a message delivery date;

storing a set of user-behavioral data in association with the user identification code in response to at least one selection made by the user from a web site, wherein the set of user-behavioral data describes a subject of each selection from the web site;

storing data that describes a plurality of products in a database;

reading from the database, in response to the message delivery date specified in the user-provided data relative to a current date, data that describes at least one product as a function of the user-provided data and the user-behavioral data;

constructing an email message including at least a portion of the data read from the database; and sending the email message to the user.

12. The method of claim 11, wherein the user-provided data includes a data set from at least one of the group consisting of customer survey data, electronic commerce transactions, product and service registration data, call center data, point of sale information and demographic data.

13. The method of claim 11, wherein the user-behavioral data includes selections of electronic newsletter subscriptions.

14. The method of claim 11, further comprising:
including web-browsable links in the email message;
including in the user-behavioral data, data descriptive of a subject of a link in the email message in response to user selection of the link.

15. An apparatus for customizing electronic communications, comprising:
means for storing a set of user-provided data in association with a user identification code in response to input of the user-provided data, wherein the user-provided data is descriptive of the user and includes a message delivery date;
means for storing a set of user-behavioral data in association with the user identification code in response to at least one selection made by the user from a web site, wherein the set of user-behavioral data describes a subject of each selection from the web site;
means for storing data that describes a plurality of products in a database;
means for reading from the database, in response to the message delivery date specified in the user-provided data relative to a current date, data that describes at least one product as a function of the user-provided data and the user-behavioral data;
means for constructing an email message including at least a portion of the data read from the database; and
means for sending the email message to the user.

16. A system for customizing electronic communications, comprising:
a first database including a set of user-provided data in association with at least one user identification code, wherein the user-provided data is descriptive of a user and includes a message delivery date, the first database further including a set of user-behavioral data in association with the at least one user identification code, wherein the set of user-behavioral data describes a subject of each selection from a web site;
a second database including data that describes a plurality of products;
a server arrangement coupled to the first and second databases, the server arrangement configured to read from the second database, in response to the message delivery date specified in the user-provided data relative to a current date, data that describes at least one product as a function of the user-provided data and the user-behavioral data in the first database, construct an email message including at least a portion of the data read from the second database, and send the email message to the user.

17. The system of claim 16, wherein the user-provided data of the first database includes data from at least one of the group consisting of customer survey data, electronic commerce transactions, product and service registration data, call center data, point of sale information and demographic data.

18. The system of claim 16, wherein the user-behavioral data indicates at least one selection of an electronic newsletter subscriptions by the user.

19. The system of claim 16, wherein the user-provided data includes a transmission frequency value that indicates a number of times a message is to be constructed and sent in a predetermined time period.

20. A computer-implemented method for customizing electronic communications to a customer, the method comprising:

storing a set of customer-provided data in a first database, the customer-provided data associated with a customer identification code and characterizing the customer;
generating a set of customer-behavioral data in response to a data selection made by the customer at an informational database;
storing the customer-behavioral data in the first database in association with the customer identification code;
configuring a content database for storage of a plurality of product data sets;
selecting at least one data set from the content database as a function of the customer-provided and the customer-behavioral data;
sending to the customer via a communications network the at least one data set from the selecting step;
obtaining access by the customer of the first database such that customer review is limited to a set of predetermined data sets; and
generating a web site and data storage location for the customer after storing the customer-provided data in the first database.

21. The method of claim 20, further comprising the step of constructing a communications message from the at least one data set as a function of a message delivery date specified in the customer-provided data.

22. The method of claim 20, wherein the customer-provided data includes a data set from at least one of the group consisting of customer survey data, electronic commerce transactions, product and service registration data, call center data, point of sale information and demographic data.

23. The method of claim 20, wherein the customer-behavioral data includes customer selections of electronic newsletter subscriptions.

24. The method of claim 21, further comprising the steps of:
capturing behavioral data from a customer review of the communications message; and
storing the captured data as customer-behavioral data in the first database.

25. The method of claim 24, wherein the step of capturing data includes transmitting customer-behavioral data via an electronic mail jumpstation arrangement to the first database.

26. The method of claim 20, wherein the step of selecting the at least one data set includes selecting the at least one data set as a function of a set of business rules defined by the vendor.

27. A system for customizing electronic communications to a customer, the system comprising:
means for storing a set of customer-provided data in a first database, the customer-provided data associated with a customer identification code and characterizing the customer;
means for generating a set of customer-behavioral data in response to a data selection made by the customer at an informational database;
means for storing the customer-behavioral data in the first database in association with the customer identification code;
means for configuring a content database for storage of a plurality of product data sets;
means for selecting at least one data set from the content database as a function of the customer-provided and the customer-behavioral data;

means for sending to the customer via a communications network the data set from the selecting step ;

means for obtaining access by the customer of the first database such that customer review is limited to a set of predetermined data sets; and means for generating a web site and data storage location for the customer after storing the customer-provided data in the first database.

* * * * *